US012678856B2

(12) United States Patent (10) Patent No.: US 12,678,856 B2
Maeda et al. (45) Date of Patent: Jul. 14, 2026

(54) LASER-ASSISTED CONTROLLED HEATING HOTSPOT MITIGATION FOR 3D PRINTING

(71) Applicant: XEROX CORPORATION, Norwalk, CT (US)

(72) Inventors: Patrick Y. Maeda, San Jose, CA (US); Adrian Lew, Stanford, CA (US); Dogan Timucin, Santa Cruz, CA (US)

(73) Assignee: XEROX CORPORATION, Norwalk, CT (US)

( * ) Notice: Subject to any disclaimer, the term of this patent is extended or adjusted under 35 U.S.C. 154(b) by 390 days.

(21) Appl. No.: 18/450,846

(22) Filed: Aug. 16, 2023

(65) Prior Publication Data

US 2025/0058376 A1 Feb. 20, 2025

(51) Int. Cl.
| | |
|---|---|
| *B22D 23/00* | (2006.01) |
| *B22D 46/00* | (2006.01) |
| *B22F 10/30* | (2021.01) |
| *B22F 10/36* | (2021.01) |
| *B22F 10/362* | (2021.01) |
| *B22F 12/50* | (2021.01) |
| *B33Y 10/00* | (2015.01) |
| *B33Y 30/00* | (2015.01) |

(52) U.S. Cl.
CPC ........... *B22D 23/003* (2013.01); *B22D 46/00* (2013.01); *B22F 10/30* (2021.01); *B22F*

*10/362* (2021.01); *B22F 12/50* (2021.01); *B33Y 10/00* (2014.12); *B33Y 30/00* (2014.12)

(58) Field of Classification Search
CPC ......... B33Y 50/02; B33Y 30/00; B33Y 10/00; B22F 10/362; B22F 10/22; B22F 10/30; B22F 12/50; B22D 23/003; B22D 46/00
See application file for complete search history.

(56) References Cited

U.S. PATENT DOCUMENTS

2021/0162493 A1* 6/2021 Herrmann ............. B22F 10/362

FOREIGN PATENT DOCUMENTS

WO WO-2022251490 A1 * 12/2022 ............. B22F 12/38

* cited by examiner

*Primary Examiner* — Jessee R Roe
(74) *Attorney, Agent, or Firm* — MH2 Technology Law Group LLP

(57) ABSTRACT

A system and method of three-dimensional printing that includes heating a portion of a build surface by impinging multiple laser pulses onto the build surface in a time controlled pattern to provide a desired heated build surface prior to depositing a molten material onto the build surface. The time controlled pattern of laser pulses includes at least one heating period and at least one cooling period, and the time for the cooling period is determined by the cooling time of the build surface material, and the temperature differences between the original temperature of the build surface and the desired temperature of the build surface material.

20 Claims, 4 Drawing Sheets

LASER-ASSISTED CONTROLLED HEATING HOTSPOT MITIGATION FOR 3D PRINTING

TECHNICAL FIELD

The present disclosure is directed to a method of three-dimensional printing using a laser pulse for heating a build surface, specifically heating the build surface in incremental steps to mitigate uneven hotspots on a build surface for three-dimensional printing.

BACKGROUND

Three-dimensional (3D) printing for building 3D parts have been used to create many different types of products, including mechanical parts for machinery. 3D printing of parts involves melting any type of material, such as aluminum alloys, into a liquid form, and depositing the molten drops onto a base foundation, such as a metal base plate, then depositing further layers of molten drops onto the previously solidified layers.

In a 3D printing system that forms a metallic part, the base plate may be temperature controlled and heated to a temperature of between 400° C. and 500° C. Molten metallic drops for 3D printing are provided at a melting point of the material prior to deposition. For example, for aluminum based alloys, the molten metallic drops are provided at approximately 750° C. When the first layer of metallic drops is deposited onto the base plate, the first layer solidifies and becomes the next build surface for the subsequent layer to be deposited onto the solidified first layer. 3D printing builds three-dimensional parts by depositing layers both horizontally and vertically onto the previous layers until a desired three-dimensional structure is formed. As additional layers of metallic drops are deposited and built upon the previous layers, the temperature of the subsequent layers drops as the new layers become further distanced from the temperature controlled base plate.

As the temperature difference increases between the newly deposited molten metallic drops and the build surface, the bonding properties between the newly deposited molten metal layer to the build surface is decreased. A laser-assisted heating mechanism can be used to heat up each subsequent build surface, which involves heating the build surface using a laser beam to raise the temperature of the interface between the build surface and the newly deposited molten metallic drops. However, due to unevenness on the build surface, or inhomogeneous material near the build surface or in the molten drops, the laser heated surface temperature may have localized variations, causing unevenness in the bonding between the build surface and newly deposited molten drops. Therefore, methods and systems for improving the quality of three-dimensional parts made from conductive liquid three-dimensional printers using a laser-assisted heating method is desired in the art.

SUMMARY

An embodiment includes a conductive liquid three-dimensional printing system comprises a build surface; a printhead for ejecting drops of a molten material onto the build surface; a temperature measuring device that measures an original temperature of the build surface; and a laser system for impinging more than one laser pulses in a time controlled pattern at the build surface to heat the build surface from the original temperature of the build surface to a desired temperature of the build surface.

An exemplary method of three-dimensional printing includes providing a molten material to a printhead of a three-dimensional printer; measuring an original temperature of a build surface; determining a temperature difference between the original temperature of the build surface and a desired temperature of the build surface; heating the build surface up to the desired temperature of the build surface by impinging more than one laser pulses onto the build surface in a time controlled pattern; and depositing the molten material onto the build surface that was heated to the desired temperature to form a layer.

An additional exemplary method of stepwise laser-assisted heating in a three-dimensional printing process includes measuring an original temperature on a build surface; calculating a temperature difference between the original temperature of the build surface and a desired temperature of the build surface; determining a number N of incremental steps to increase the original temperature on the build surface to the desired temperature of the build surface; calculating a temperature change needed during each of the N incremental steps using a formula $(1/(N-1))$ multiplied by the calculated temperature difference; and heating the build surface to the desired temperature of the build surface for the determined number N of incremental steps using a laser.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

Figure 1:
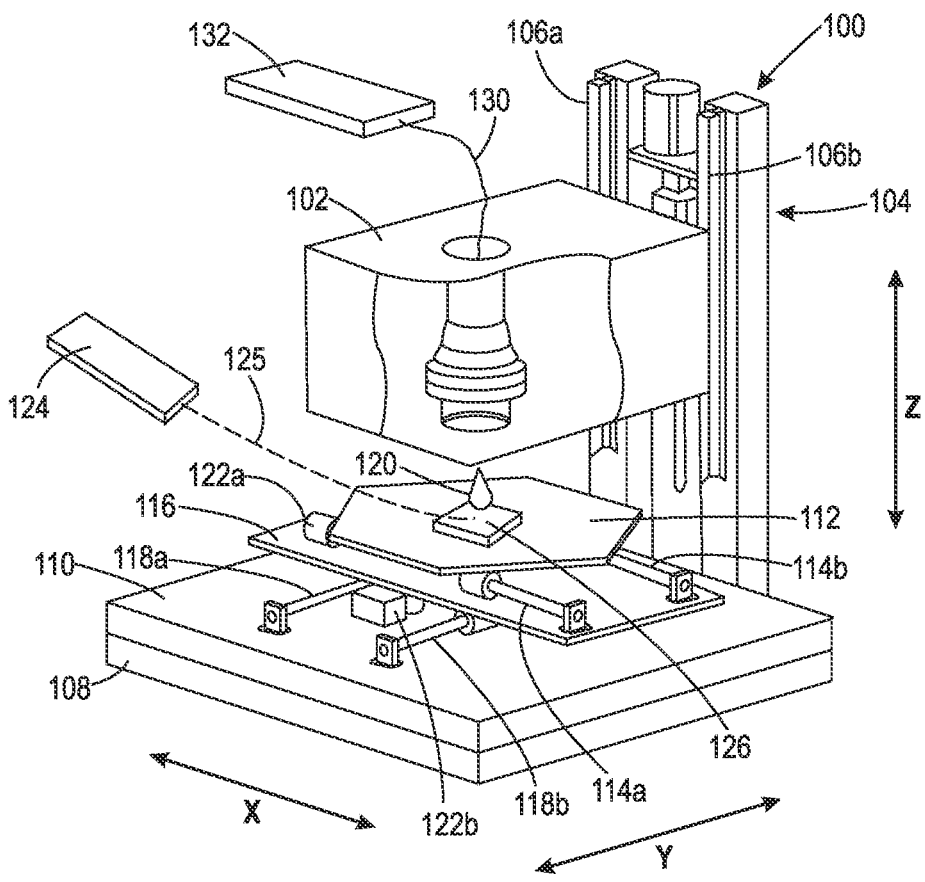
FIG. 1 shows a schematic drawing of a three-dimensional printing system including a print head and a laser system.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

An exemplary three-dimensional (3D) printing system 100 for printing metal components is shown in FIG. 1. The 3D printing system 100 includes a printhead 102 supported by a tower 104. The printhead 102 is affixed to the tower 104 can move along a vertical z-axis via tracks 106*a* and 106*b*. The tower 104 is supported by a frame 108, which is situated below the printhead 102.

The frame 108 also provides support to a base 110 that is situated below a base plate 112. Base plate 112 is supported by x-axis tracks 114*a* and 114*b*, which enable base plate 112 to move along an x-axis. X-axis tracks 114*a* and 114*b* are affixed to a stage 116. Stage 116 is supported by y-axis tracks 118*a* and 118*b*, which enable stage 116 to move along a y-axis. Actuators 122*a* and 122*b* are provided to follow user programmed movements of the base plate 112 and stage 116.

The base plate 112 is used as a starting build surface for the desired 3D printed component. The base plate 112 can be heated to a range of temperatures that can adequately accommodate the 3D component being printed. For example, for printing aluminum alloy based metallic components, the base plate 112 may be heated and temperature controlled at a temperature range of between 400° C. and 500° C.

Source material 132 may be provided to the printhead 102 in the form of a metallic wire 130, or in other applicable forms depending on the type of material supplied to the 3D printing system 100. Source material 132 may be a metallic material in the form of a spool of wire, a bar, a rod, granular shapes, or an applicable combination thereof. Alternatively, conductive liquids or colloidal mixtures may also be provided to the printhead 102 according to the design of the 3D component to be printed and adjustments to the 3D printing system 100. Molten material may also be provided directly to the printhead. In this disclosure, the source material 132 will be exemplified herein as an aluminum alloy. Other metallic material that may be provided to the printhead 102 in the 3D printing system 100 include copper, brass, nickel alloys, tin alloys, stainless steels, iron, titanium alloys, or a combination thereof.

As the material 130 is fed through the printhead 102, the material is deposited as molten metal 120 (e.g. molten aluminum or aluminum alloy) onto base plate 112, and solidifies into a layer 126, or a build part. The layer 126 becomes the subsequent build surface, and the material is deposited along the x-axis, y-axis, and z-axis in programmed movements that can be moved both horizontally and vertically to create each subsequent layer until a desired 3D printed component is formed. A temperature measuring device, not shown, is also included in the 3D printing system.

The base plate 112 can be temperature controlled via a heating mechanism attached, not shown in the figure, or can be heated via a laser system 124. The laser system 124 is typically mounted to the printhead and therefore moves in tandem with the printhead 102. If the laser system 124 is not fixed or stationary relative to the printhead 102, a separate mechanism must be provided to position the laser beam 125 from the laser system 124 in the proper position on the build surface to ensure the laser beam 125 is pointed at a desired location on the build surface.

Figure 2:
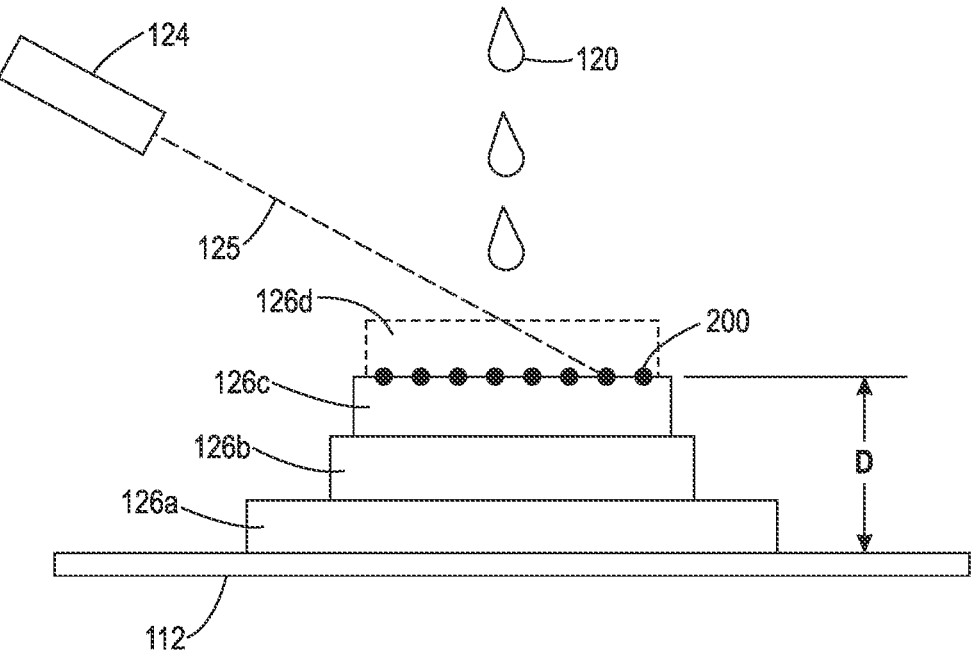
FIG. 2 shows a schematic cross-sectional drawing of deposited layers of material and a laser system.

The deposition process is further exemplified in FIG. 2, a simplified schematic depiction of the vertical deposition of layers. Base plate 112 is provided as a build surface for layer 126*a*, and is a platform for additional layers 126*a*, 126*b*, 126*c*, and 126*d*. The first layer 126*a* is deposited onto base plate 112, the second layer 126*b* is subsequently vertically deposited onto the first layer 126*a* after the first layer 126*a* has solidified, and then the third layer 126*c* is similarly deposited vertically onto the second layer 126*b*. Each of the layers became the next build surface for the subsequent layer to be deposited.

As an example, the third layer 126*c*, being the newest or topmost layer in this depiction, includes the next build surface 200 that will be the interface with the fourth layer 126*d*. As more layers are deposited onto the base plate 112, the distance D of the build surface 200 from the base plate 112 becomes greater, and thus it becomes harder to control the temperature of the subsequent build surfaces. A decrease in the build surface temperature lessens the bonding capability of the build surface with subsequent molten metal 120 deposited onto the built surface. The temperature difference between the build surface and the subsequent molten drops can be decreased by heating the build surface using additional mechanisms.

A laser pulse or laser beam 125 from the laser system 124 can be used to heat up the build surface 200. The laser system can be any suitable type of laser that can achieve the desired irradiance. The desired irradiance can vary depending on, for example, the type of metal being deposited and the deposition rate. Examples of desired irradiance ranges are from between about 1,000 $W/cm^2$ to about 100,000 $W/cm^2$, such as about 1,500 $W/cm^2$ to about 50,000 $W/cm^2$, or about 2,000 $W/cm^2$ to about 15,000 $W/cm^2$. In an example, the laser can provide a laser beam having an irradiance between about 100 $W/mm^2$ to about 70,000 $W/mm^2$, or about 1,000 $W/mm^2$ to about 20,000 $W/mm^2$. Typical laser spot sizes are between 0.5 mm and 2.0 mm and are selected to be larger than the molten drop diameter. A laser having any combination of power, spot size, and optical configuration, including collimated and non-collimated lasers, that can achieve the desired irradiance can be employed.

The laser system 124 provides laser-assisted heating to the built surface by impinging one or multiple pulses of laser beams 125 (or laser pulses) onto the build surface 200. The laser pulse 125 is provided onto a specific predetermined surface location on the build surface 200 that the next molten metal drops would be deposited upon. The laser beam has typically been provided to reach the desired temperature on the build surface within a single pulse, as graphically shown in FIG. 3. A laser pulse P is typically provided in a single step over a period of time t, and the temperature of the build surface is increased from the measured build surface temperature to the desired temperature T. The increase in surface temperature ST is achieved within one pulse of the laser beam, or also can be described as a one step process.

As an example, a build surface temperature may be provided at an original temperature of about 400° C., and a desired temperature of the build surface for receiving molten drops may be about 750° C. The laser pulse P may be provided to one specific location on the build surface over a period of time t such that the measured build surface temperature is increased from 400° C. to 750° C. within a single laser pulse P.

When conducting two-color pyrometer temperature measurements of the build surfaces, it has been found that the laser illuminated (or laser heated) build surfaces have significant variations in the temperature distribution across the build surface. This is caused by uneven build surfaces that include peaks and valleys in the build surface and subsurface microstructure. Under laser illumination, the uneven build surfaces would cause light trapping in the valleys of the build surfaces, and thus the temperature of the valleys are seen to be higher than on the peaks of the build surface.

This phenomenon also may be seen on a build surface formed by a material mixture that is inhomogeneous in nature. The local thermal conductivity due to material inhomogeneities, voids, microstructure variations, etc., cause localized heating in different portions of the build surface, and thus causes temperature on the build surface to vary across the surface. Subsequent molten material that is deposited onto the disproportionately heated surface may solidify into an unevenly distributed layer along the hotter and cooler areas on the build surface.

Hotspots that exceed the melting point of the material can also produce spatter and eject molten material in the vicinity of the hotspot as well as other more remote areas of the build part. In severe cases, "keyholing" (vaporization or ablation of material causes a hole to form) in the build part surface from the ejected molten material can be initiated, creating deeper valleys in the build surface resulting in ever-increasing light trapping and absorption of laser energy to produce a runaway heating situation. Heat diffusion increases with the local temperature gradient. If the build part surface temperature can be increased to the desired final level while keeping the hotspot temperature below the melting or liquidus point of the material, the presence of hotspots is not expected to adversely impact the printing process.

To accommodate for the uneven heating, the laser pulse P may have typically been provided to a first location on the build surface 200 to heat from a measured original temperature of the build surface to a desired temperature T in a single laser pulse P in time t, then moved to another location on the build surface 200 to heat a spot that may have been measured to be unevenly cooler than the first location that had been previously heated by the laser pulse P, and the second spot is then heated using another laser pulse P to the desired temperature in time t. Using the previous example, a typical method may provide laser pulse P to a first location on a build surface to heat from 400° C. to 750° C. in time t, then the laser may be moved on the x and y axis to a second location that is measured at 600° C., and heat the second location to 750° C. by another laser pulse P in time t.

This method of providing a single laser pulse P and moving the laser pulse P to a cooler location may be time consuming, and may still cause further uneven heating and cooling of the build surface 200 by providing laser pulse P to heat one or multiple additional cooler locations on the build surface, and letting the previously heated locations to cool off in an uncontrolled manner while trying to heat the unevenly heated spots caused by the first laser pulse P.

Figure 3:
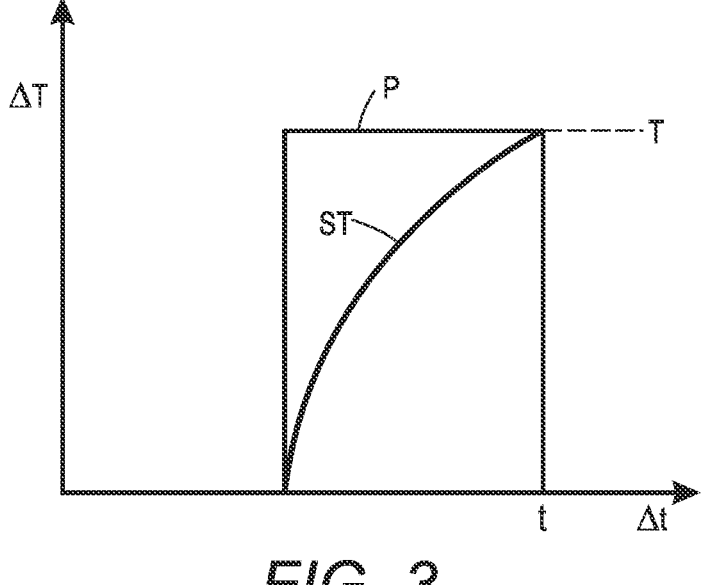
FIG. 3 shows a graphical depiction of built surface temperature changes during a single pulse laser-assisted heating method over time.

To mitigate hotspots that are seen by heating a build surface using the one step process shown in FIG. 3, a laser-assisted controlled heating of a build surface for 3D printing is described herein in a stepwise (or incremental step) method that provides multi-step heating and cooling periods that increase the original temperature of a build surface to the desired temperature across a build surface over a period of time without having to move the laser to additional unevenly heated portions of the build surface.

In an exemplary 3D printing method, the laser system is fixed to the printhead of a 3D printing system, and the laser beam is centered on the drop landing location on the build surface. The laser beam footprint or spot size on the build surface is typically 2 to 3 times larger than the molten drop size, which allows the build surface to be heated regardless of the direction the build part and/or build surface moves in the X-Y plane into the drop landing location.

The stepwise laser-assisted heating method is provided in a time controlled pattern that mitigates the formation of non-uniform temperature spread on build surfaces. The time controlled pattern involves having heating time periods in a patterned smaller increments of time (than compared to the heating time for a single step laser assisted heating method, for example, in FIG. 3), and having cooling time periods in between the heating time periods such that heat is allowed to rapidly "fall" from the hotter spots towards the cooler spots within the build surface material. The stepwise method increases the temperature of one location on the build surface slowly, which allows the heat to be spread from hotter spots to cooler spots over a larger area instead of moving the laser pulse from one location on the build surface to another. This helps produce stable pyrometer temperature measurements across the build surface, and enable closed-loops laser power control.

Figure 4:
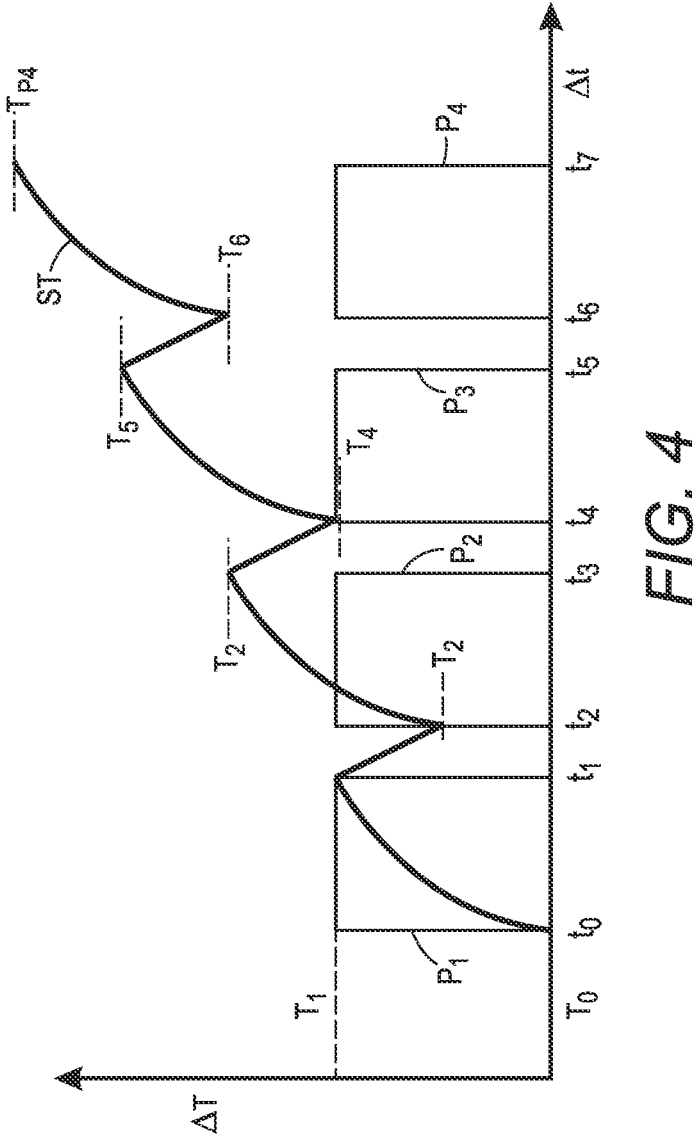
FIG. 4 shows a graphical depiction of built surface temperature changes during a four pulse laser-assisted heating method over time.

The stepwise laser-assisted heating method may include as many laser pulses as desired to reach the desired temperature over a period of time. At a minimum, the stepwise or multi-step laser-assisted heating method includes more than one heating periods and at least one cooling periods. FIG. 4 shows an exemplary four-step laser-assisted heating method that increases the build surface temperature to a desired temperature T slowly over multiple laser pulses with heating periods and cooling periods provided in a time controlled pattern that are predetermined based on the temperature difference between the measured original temperature of the build surface and the desired temperature of the build surface. In FIG. 4, multiple laser pulses $P_1$, $P_2$, $P_3$, and $P_4$ are conducted for a period of time $\Delta t$, with "off" periods of time between each of the laser pulses $P_1$, $P_2$, $P_3$, and $P_4$. Surface temperature ST of the build surface increases during the heating periods during each of the laser pulses, and the surface temperature ST of the build surface drops during the cooling periods in between the laser pulses.

For example, if the build surface temperature is provided at a measured original temperature of 400° C. and the desired build surface temperature T is 750° C., the four-step laser-assisted heating method shown in FIG. 4 provides multiple laser pulses $P_1$, $P_2$, $P_3$, and $P_4$ that each have shorter heating time periods as compared to FIG. 3 to reach the desired build surface temperature of 750° C. across the build surface, and includes cooling time periods in between each of the laser pulses $P_1$, $P_2$, $P_3$, and $P_4$. The total time of the four time periods of FIG. 4 added together may be longer than the single pulse time period t such as shown in FIG. 3.

In another exemplary 3D printing method, a base plate of the 3D printing system is a heated base platform. The original temperature of a build surface in this 3D printing system may be estimated based on the temperature of the heated base plate prior to laser-assisted heating, and the distance of the build surface in proximity to the base plate. The closer the distance of the build surface is from the base plate, the closer the build surface temperature is to the temperature of the heated base plate. Then, using the estimated original temperature of the build surface, a multi-step laser-assisted heating method of more than one heating periods and at least one cooling periods can be formulated to raise the estimated original temperature of the build surface to the predetermined desired temperature of the build surface.

In between each of the laser pulses, the "off" cooling periods are determined by a length of time that is less than a "cooling time" determined by the particular build surface material used in the 3D printing. The "cooling time" of a material is defined as a time period that a material cools from a heated temperature to an original temperature after it has been heated by a laser. The metal material will cool after the laser illumination is turned "off" due to heat losses from the thermal conductivity of the metal, radiation, and convection. The cooling time is therefore determined primarily by the material properties of the metal, namely, its specific heat capacity, density, thermal conductivity, the local temperature and surrounding temperature gradients of the heated area, and the ambient temperature. The temperature will typically drop exponentially with time after the laser illumination is turned "off".

The cooling time periods between the laser pulses cannot be more than a full or a 100% cooling time of a material that would allow the material to fully cool off from a heated temperature to the measured or estimated original temperature, so that in subsequent laser pulses, the heated temperature of the material can build up to achieve the desired heated surface temperature within the predetermined number of pulses. In other words, the cooling time is less than a 100% cooling time of the build surface material, which is the total time needed for the temperature of the heated build surface to cool down to the measured or estimated original temperature of the build surface prior to laser pulse heating.

With high thermal conductivity in a metallic material, it has been found that, for example, a 50% cooling times of a metal build surface, such as aluminum or an aluminum alloy material, may be between about 0.1 msec to about 1 msec, particularly between about 0.25 msec to about 0.5 msec, and more particularly about 0.33 msec.

Using the previously mentioned example, the original surface temperature of an aluminum alloy material may be 400° C. and a heated surface temperature may be 750° C. If the full or 100% cooling time for an aluminum alloy material from 750° C. to 400° C. may be 2 msec, then the "cooling time" as shown in between the laser pulses in FIG. 4 for a four-step heating method must be less than 2 msec, so that the temperature of the aluminum alloy material continues to build upon a temperature that is more than the original surface temperature.

Cooling and temperature diffusion rates may be higher for the locations of the build surface with higher temperature gradients. A higher gradient hotspot on the build surface would cool and spread more rapidly than on the build surface areas where the temperature distribution is more uniform. The differences in temperature gradients across the builds surface may be due to the types of metal used in the material, and the inhomogeneous nature of the material used to build the 3D part. Different cooling time may be needed based on the types of material used and the melting temperature of the material desired to be deposited onto the heated build surface.

It has been found that, to determine the desired temperature increase during the heating periods of the laser pulses being turned "on", with the number N of laser pulses in the stepwise laser-assisted heating method being predetermined, the desired temperature increase during each of the N laser pulses is about $(1/(N-1))$ multiplied by the temperature difference between the measured or estimated build surface temperature and the desired temperature. This formula will reduce the amplitude of the hotspot temperatures by $(N-2)/(N-1)$ of the N pulses.

In another embodiment, the stepwise or incremental step method can include less or more than four laser pulses (or four steps) to achieve the desired increase in temperature.

The "off" time between pulses can be less that the 50% cooling time and laser power of the pulses can be modulated (increased or decreased) as well. The formula and implementation can depend on the unique surface characteristics of the part produced by the printing process. The formula for determining the number N of laser pulses should be adjusted, optimized, or fine-tuned empirically as part of the print process optimization while adjusting different parameters for the printing process (i.e., drop frequency, drop temperature, build plate speed, etc.). The modulation pattern of the multi-step (or stepwise) laser pulsing can vary in time, the number of pulses, the "on" time of each pulse, the power of each pulse, and the "off" or cooling time of each pulse. The modulation pattern can also vary between each section or each layer of the build surface, depending on the final geometry or 3D shape of the build part to be achieved.

An exemplary incremental step method is shown in FIG. 4. When the first laser pulse $P_1$ is turned on from time $t_0$ to time $t_1$ for a heating period of time, the surface temperature ST of the build surface increases from temperature $T_0$ to temperature $T_1$. Then, the first laser pulse $P_1$ is turned off for a cooling period of time from time $t_1$ to time $t_2$, such that the surface temperature ST of the build surface drops from temperature $T_1$ to temperature $T_2$. When the temperature reaches $T_2$, a second laser pulse $P_2$ is turned on for a heating period of time from time $t_2$ to time $t_3$, and increases the surface temperature ST from temperature $T_2$ to temperature $T_3$. At time $t_3$, the second laser pulse $P_2$ is turned off, and the surface temperature ST is allowed to cool for a period of time from time $t_3$ to time $t_4$, from temperature $T_3$ to temperature $T_4$. The process is repeated when the third pulse $P_3$ is turned on, during which the surface temperature ST of the build surface increases from temperature $T_4$ at time $t_4$ to temperature $T_5$ at time $t_5$, and when the third laser pulse $P_3$ is turned off at time $t_5$, the surface temperature ST then drops from temperature $T_5$ to temperature $T_6$ between time $t_5$ and time $t_6$. During the fourth (and final) laser pulse $P_4$, the surface temperature ST is increased from temperature $T_6$ at time $t_6$ to the final desired surface temperature $T_{p4}$ at time $t_7$.

In the exemplary four pulse laser-assisted heating method shown in FIG. 4, an aluminum alloy material can be used as the molten metallic drops, and the aluminum alloy material has about 0.33 msec for its 50% cooling time or "off" period, and the hotspot amplitude is reduced by about ⅔. In other words, the change of temperature $\Delta T$ of the build surface for an aluminum alloy between temperature $T_0$ to temperature $T_1$, temperature $T_2$ to temperature $T_3$, temperature $T_4$ to temperature $T_5$, and temperature $T_6$ to final temperature $T_{p4}$, is about ⅓ of the temperature change in temperature $\Delta T$ of the single laser pulse example provided in FIG. 3.

In an exemplary stepwise laser-assisted heating method, the temperature increase during each laser pulse are the same. Alternatively, the temperature increase may differ between each laser pulse, depending on the temperature detected across the build surface.

In an exemplary stepwise laser-assisted heating method, the temperature drop between each laser pulse are the same. Alternatively, the temperature drop between each laser pulse are different, depending on the temperature detected across the build surface.

Additionally, the stepwise laser-assisted heating method may heat a surface area of a build surface that is between about 0.01 mm to about 5 mm in diameter, particularly about 0.3 mm to about 3 mm in diameter, and more particularly between about 1 mm to about 2 mm in diameter on the build surface.

Figure 5:
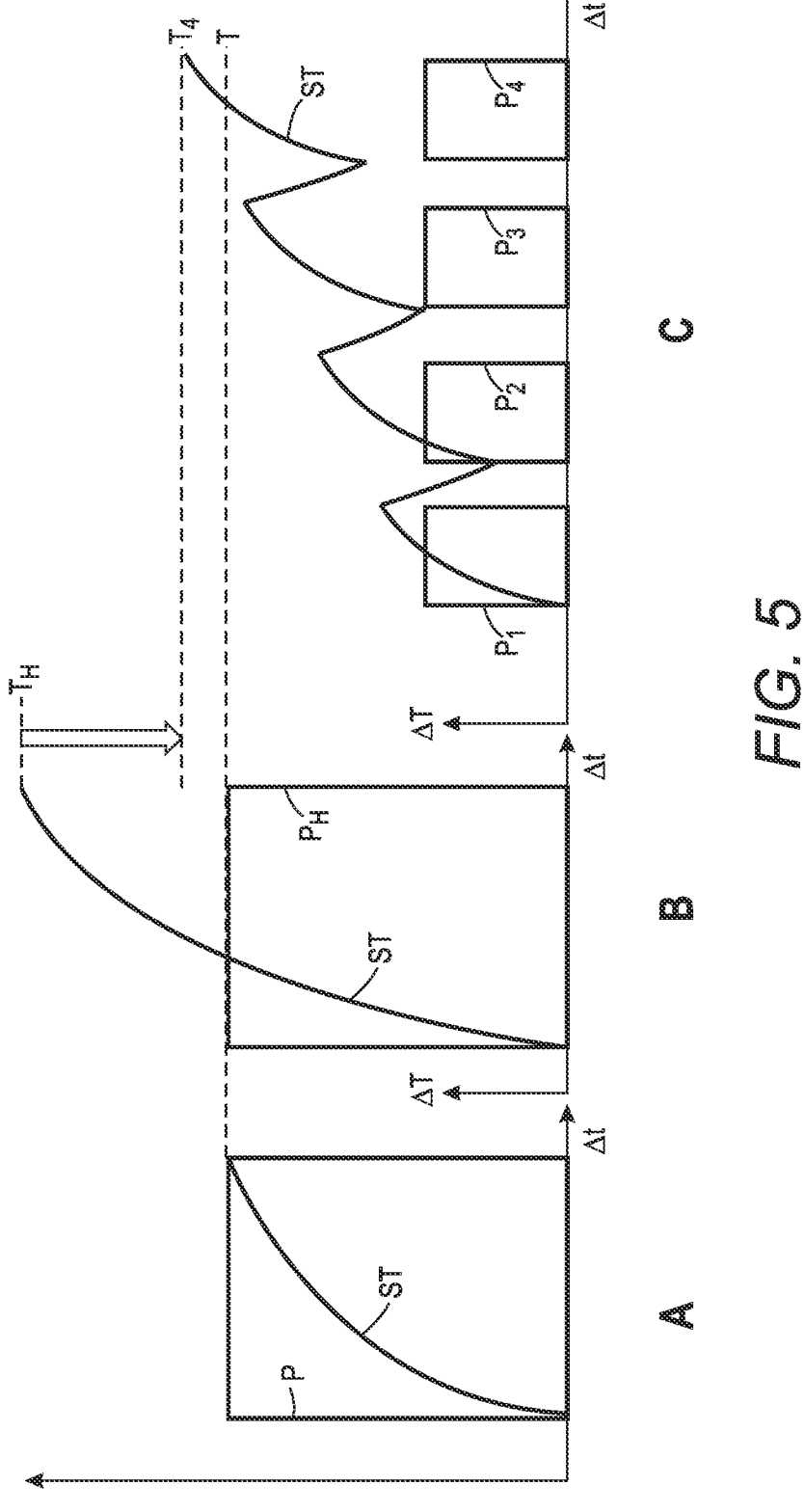
FIG. 5 shows a comparison chart between a single pulse laser-assisted heating method (Example A), a single pulse laser-assisted heating method with hotspot formation (Example B), and a four pulse laser-assisted heating method (Example C).

FIG. 5 provides a comparison chart of examples A, B, and C, to illustrate the advantages that a stepwise laser-assisted heating method could have over the single-step or single pulse laser-assisted heating method. An ideal single pulse laser-assisted heating method that does not have a hotspot formation, such as described in FIG. 3, is shown as Example A in FIG. 5. The laser pulse P is provided over a period of time that allows the surface temperature ST to increase to desired temperature T. The build surface in Example A would not have any peaks or deep valley on the surface that would cause any light trapping, and does not have inhomogeneities in the underlying build surface that would cause a lowering in the local heat conductivity, etc.

Example B in FIG. 5 shows a single pulse laser-assisted heating method that includes a hotspot formation, likely due to having peaks or valleys on the build surface. The laser pulse PH is provided over a similar period of time as provide in Example A, but the heating causes the surface temperature ST to increase to $T_H$, which is significantly higher than the desired temperature T in Example A.

Example C in FIG. 5 shows a stepwise or multi-pulse laser-assisted heating method that utilizes four pulses $P_1$, $P_2$, $P_3$, and $P_4$, over a longer period of time to achieve a surface temperature $T_{P4}$ that is only slightly higher than the desired temperature T of Example A, but significantly lower than the surface temperature with a hotspot formation $T_H$ of Example B. The stepwise laser-assisted heating method can mitigate hotspot formation even in the presence of pits or deep valleys in the build surface that causes light trapping, and in the presence of inhomogeneities in the build surface material.

As the Examples show, by heating in a stepwise (or incremental step) method that includes multiple laser pulses and cooling time in between each laser pulse, the hotspots are able to "fall away" from the hotter spots to cooler spots on the build surface, thus balancing out the uneven heating between the peaks and valleys on the build surface, and allows for a more uniformly heated build surface to receive the subsequent molten material deposits. This stepwise laser-assisted heating method also allow for heating on a smaller surface area, since the laser-assisted heating time would be shorter and the heat on the build surface would not spread out as widely.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

What is claimed is:

1. A method of three-dimensional printing comprising:
providing a molten material to a printhead of a three-dimensional printer;
measuring an original temperature of a build surface;
determining a temperature difference between the original temperature of the build surface and a desired temperature of the build surface;
determining a number of laser pulses to achieve the temperature difference; and
calculating an increase in temperature needed during each of the laser pulses;
heating the build surface up to the desired temperature of the build surface temperature by impinging more than one laser pulses onto the build surface in a time controlled pattern; and
depositing the molten material onto the build surface that was heated to the desired temperature to form a layer.

2. The method of claim 1 further comprising:
identifying a portion of the layer as a subsequent build surface;
heating the subsequent build surface by impinging more than one laser pulses onto the subsequent build surface; and
depositing the molten material onto the heated subsequent build surface.

3. The method of claim 1, wherein the molten material is aluminum or an aluminum alloy.

4. The method of claim 1, wherein the laser pulses have an irradiance of from about 1000 W/cm² to about 10,000 W/mm².

5. The method of claim 1, wherein the laser pulses are impinged onto a surface area of the build surface of between about 0.01 mm to about 5 mm in diameter.

6. A method of stepwise laser-assisted heating in a three-dimensional printing process comprising:
estimating an original temperature on a build surface;
calculating a temperature difference between the original temperature of the build surface and a desired temperature of the build surface;
determining a number N of incremental steps to increase the original temperature on the build surface to the desired temperature of the build surface;
calculating a temperature change needed during each of the N incremental steps using a formula $(1/(N-1))$ multiplied by the calculated temperature difference; and
heating the build surface for the determined number N of incremental steps using a laser.

7. The method of claim 6, wherein the incremental steps include a time controlled pattern of heating periods of time and cooling periods of time.

8. The method of claim 7, wherein the cooling periods of time is less than a 100% cooling time of the build surface.

9. The method of claim 7, wherein the heating periods of time are determined by a time needed to increase to the calculated temperature change needed during each of the N incremental steps.

10. The method of claim 6, wherein the laser has an irradiance of from about 1000 W/mm² to about 10,000 W/mm².

11. The method of claim 6, wherein the laser heats the build surface by impinging one or more laser pulses onto a surface area of the build surface of between 0.01 mm to about 5 mm in diameter.

12. The method of claim 8, wherein the cooling time period of a build surface is a 50% cooling time of the build surface.

13. The method of claim 6, further comprising depositing a molten material to form a layer onto the build surface that was heated to the desired temperature.

14. A method of three-dimensional printing comprising:

providing a molten material to a printhead of a three-dimensional printer;

measuring an original temperature of a build surface;

determining a temperature difference between the original temperature of the build surface and a desired temperature of the build surface;

heating the build surface up to the desired temperature of the build surface temperature by impinging more than one laser pulses onto the build surface in a time controlled pattern; and depositing the molten material onto the build surface that was heated to the desired temperature to form a layer, wherein the time controlled pattern includes one or more of heating time periods when the laser pulse is turned on, and one or more cooling time periods in between each one or more heating time period when the laser pulse is turned off.

15. The method of claim 14 further comprising:

identifying a portion of the layer as a subsequent build surface;

heating the subsequent build surface by impinging more than one laser pulses onto the subsequent build surface; and depositing the molten material onto the heated subsequent build surface.

16. The method of claim 14, wherein the cooling time period is less than a 100% cooling time of the build surface.

17. The method of claim 16, wherein the cooling time period of a build surface is a 50% cooling time of the build surface.

18. The method of claim 14, wherein the molten material is aluminum or an aluminum alloy.

19. The method of claim 14, wherein the laser pulses have an irradiance of from about 1000 $W/cm^2$ to about 10,000 $W/mm^2$.

20. The method of claim 14, wherein the laser pulses are impinged onto a surface area of the build surface of between about 0.01 mm to about 5 mm in diameter.

* * * * *